(12) United States Patent
Chen et al.

(10) Patent No.: US 11,314,309 B2
(45) Date of Patent: Apr. 26, 2022

(54) ELECTRONIC DEVICE CONTROL METHOD AND APPARATUS, AND ELECTRONIC DEVICE

(71) Applicant: Huawei Technologies Co., Ltd., Shenzhen (CN)

(72) Inventors: Xiaoxiao Chen, Nanjing (CN); Yungao Pan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 124 days.

(21) Appl. No.: 16/347,139

(22) PCT Filed: Sep. 22, 2017

(86) PCT No.: PCT/CN2017/102958
§ 371 (c)(1),
(2) Date: May 2, 2019

(87) PCT Pub. No.: WO2018/082412
PCT Pub. Date: May 11, 2018

(65) Prior Publication Data
US 2019/0369700 A1    Dec. 5, 2019

(30) Foreign Application Priority Data
Nov. 3, 2016   (CN) .......................... 201610956677.1

(51) Int. Cl.
*G06F 1/32*     (2019.01)
*G06F 1/3212*   (2019.01)
*G06F 1/3234*   (2019.01)

(52) U.S. Cl.
CPC .......... *G06F 1/3212* (2013.01); *G06F 1/3243* (2013.01); *G06F 1/3265* (2013.01); *G06F 1/3275* (2013.01)

(58) Field of Classification Search
CPC ................. G06F 1/32; G06F 1/26; G06F 9/44
See application file for complete search history.

(56) References Cited

U.S. PATENT DOCUMENTS 8,935,554 B2 *  1/2015  Yanase .................. G06F 1/3203
                                                         713/323
9,210,031 B1 *  12/2015  Kirby .................... H04L 47/783
(Continued)

FOREIGN PATENT DOCUMENTS

CN    101873385 A    10/2010
CN    103631359 A     3/2014
(Continued)

OTHER PUBLICATIONS

Machine Translation and Abstract of International Publication No. WO2015197000, Dec. 30, 2015, 28 pages.
(Continued)

*Primary Examiner* — Keshab R Pandey
(74) *Attorney, Agent, or Firm* — Conley Rose, P.C.

(57) ABSTRACT

An electronic device control method, apparatus, and an electronic device, where the electronic device control method includes determining a running mode of a current running application in an electronic device, and controlling, based on the running mode, a component in the electronic device to execute an operation corresponding to the running mode, where the component includes a component employed for running the current running application.

20 Claims, 9 Drawing Sheets

(56) References Cited

U.S. PATENT DOCUMENTS

| | | | | |
|---|---|---|---|---|
| 2012/0174107 | A1* | 7/2012 | Guo | G01R 31/382 |
| | | | | 718/100 |
| 2013/0040276 | A1* | 2/2013 | Takakura | A61N 5/0618 |
| | | | | 434/335 |
| 2014/0143566 | A1 | 5/2014 | Asano | |
| 2014/0215241 | A1* | 7/2014 | Yoon | G06F 1/3206 |
| | | | | 713/322 |
| 2016/0164960 | A1* | 6/2016 | Marinelli | H04L 67/104 |
| | | | | 709/201 |
| 2016/0212256 | A1* | 7/2016 | Gan | G06F 1/1616 |
| 2016/0226262 | A1* | 8/2016 | Fukubayashi | H02J 7/007 |
| 2017/0244809 | A1* | 8/2017 | Chae | H04L 41/5054 |

FOREIGN PATENT DOCUMENTS

| | | |
|---|---|---|
| CN | 104615415 A | 5/2015 |
| CN | 104639768 A | 5/2015 |
| CN | 105749551 A | 7/2016 |
| CN | 105867580 A | 8/2016 |
| WO | 2015197000 A1 | 12/2015 |

OTHER PUBLICATIONS

Machine Translation and Abstract of Chinese Publication No. CN105867580, Aug. 17, 2016, 11 pages.
Machine Translation and Abstract of Chinese Publication No. CN104639768, May 20, 2015, 13 pages.
Foreign Communication From A Counterpart Application, Chinese Application No. 201610956677.1, Chinese Office Action dated Oct. 28, 2019, 8 pages.
Machine Translation and Abstract of Chinese Publication No. CN101873385, Oct. 27, 2010, 10 pages.
Machine Translation and Abstract of Chinese Publication No. CN103631359, Mar. 12, 2014, 21 pages.
Machine Translation and Abstract of Chinese Publication No. CN104615415, May 13, 2015, 15 pages.
Foreign Communication From A Counterpart Application, PCT Application No. PCT/CN2017/102958, English Translation of International Search Report dated Dec. 27, 2017, 2 pages.
Foreign Communication From A Counterpart Application, PCT Application No. PCT/CN2017/102958, English Translation of Written Opinion dated Dec. 27, 2017, 3 pages.

* cited by examiner

ELECTRONIC DEVICE CONTROL METHOD AND APPARATUS, AND ELECTRONIC DEVICE

CROSS-REFERENCE TO RELATED APPLICATIONS

This application is a U.S. National Stage of International Patent Application No. PCT/CN2017/102958 filed on Sep. 22, 2017, which claims priority to Chinese Patent Application No. 201610956677.1 filed on Nov. 3, 2016. Both of the aforementioned applications are hereby incorporated by reference in their entireties.

TECHNICAL FIELD

Embodiments of the present invention relate to electronic device technologies, and in particular, to an electronic device control method and apparatus, and an electronic device.

BACKGROUND

With development of electronic communications technologies, an electronic device implements more functions, causing higher power consumption to the electronic device. In addition, a user requires a lightening and thinning electronic device, limiting a battery capacity of the electronic device.

Currently, various applications may be installed in most electronic devices, to implement functions corresponding to the applications. However, based on abundant functions, the user further imposes higher requirements on application performance implemented by the electronic device. However, with improvement of the application performance, the power consumption of the electronic device increases accordingly.

To enable the electronic device to better serve the user, when the battery capacity is limited, it is extremely important to reduce power consumption and improve a battery life of the electronic device when a performance requirement is met.

SUMMARY

Embodiments of the present invention provide an electronic device control method and apparatus, and an electronic device, to reduce power consumption and improve a battery life of the electronic device when a user requirement of an application is met.

According to an aspect, an embodiment of the present invention provides an electronic device control method, including:
  determining a running mode of a current running application in an electronic device; and
  controlling, based on the running mode, a component required for running the current running application in the electronic device to execute an operation corresponding to the running mode.

According to the electronic device control method, component power consumption of the electronic device may match a user requirement of an application when a user requirement of the current running application in the running mode is met, to avoid high power consumption of the electronic device that is caused because an application requirement is blindly improved, and reduce power consumption of the electronic device, thereby improving a battery life of the electronic device.

In an implementation of the aspect, the determining a running mode of a current running application in an electronic device may include:
  determining whether the current running application in the electronic device is an application of a preset type; and if the current running application is an application of the preset type, determining the running mode of the current running application in the electronic device.

According to the electronic device control method, a current running application that is the application of the preset type may be controlled in the electronic device, while running applications of all types in the electronic device do not need to be controlled, so that control on the electronic device can be more accurate.

In another implementation of the aspect, the determining whether the current running application in the electronic device is an application of a preset type may include:
  determining, based on an engine identifier of the current running application, whether an engine of the current running application is an engine of the application of the preset type; and
  if the engine of the current running application is the engine of the application of the preset type, determining that the current running application is the application of the preset type; or
  if the engine of the current running application is not the engine of the application of the preset type, determining that the current running application is not the application of the preset type.

In another implementation of the aspect, the determining whether the current running application in the electronic device is an application of a preset type includes:
  determining, based on a type identifier of the current running application, whether the current running application is the application of the preset type; and
  if the current running application is the application of the preset type, determining that the current running application is the application of the preset type; or
  if the current running application is not the application of the preset type, determining that the current running application is not the application of the preset type.

In still another implementation of the aspect, the determining whether the current running application in the electronic device is an application of a preset type includes:
  determining whether the current running application is an application in a preset application list; and
  if the current running application is the application in the preset application list, determining that the current running application is the application of the preset type; or
  if the current running application is not the application in the preset application list, determining that the current running application is not the application of the preset type.

In still another implementation of the aspect, the determining whether the current running application in the electronic device is an application of a preset type includes:
  determining, based on vendor information of the current running application, whether the current running application is an application of a preset vendor; and
  if the current running application is the application of the preset vendor, determining that the current running application is the application of the preset type; or if the current running application is not the application of the preset vendor, determining that the current running application is not the application of the preset type.

According to each electronic device control method, a plurality of implementations for determining whether the current running application is the application of the preset type are provided, so that the electronic device control method has more implementation scenarios, power consumption of the electronic device is reduced in many scenarios, and a battery life of the electronic device is improved.

In still another implementation of the aspect, the controlling, based on the running mode, a component in the electronic device to execute an operation corresponding to the running mode includes at least one of the following:

controlling a voice device of the electronic device to turn off or turn down volume;
controlling a display screen of the electronic device to reduce resolution;
controlling the display screen to reduce a frame rate;
controlling the display screen to scale down a display window;
controlling the display screen to reduce display luminance;
controlling a processor of the electronic device to reduce image rendering quality;
controlling the processor to reduce a working frequency; and
controlling a random access memory of the electronic device to reduce a working frequency.

In still another implementation of the aspect, the controlling, based on the running mode, a component in the electronic device to execute an operation corresponding to the running mode include:

detecting a current device status of the electronic device; and
when the current component status is greater than or equal to a preset status parameter, controlling the component in the electronic device to execute the operation corresponding to the running mode.

In still another implementation of the aspect, the controlling, based on the running mode, a component in the electronic device to execute an operation corresponding to the running mode includes at least one of the following:

controlling a voice device of the electronic device to turn on or turn up volume;
controlling a display screen of the electronic device to increase resolution;
controlling the display screen to increase a frame rate;
controlling the display screen to scale up a display window;
controlling the display screen to increase display luminance;
controlling a processor of the electronic device to improve image rendering quality;
controlling the processor to increase a working frequency; and
controlling a random access memory of the electronic device to increase a working frequency.

In still another implementation of the aspect, the controlling, based on the running mode, a component in the electronic device to execute an operation corresponding to the running mode include:

detecting a current device status of the electronic device; and if the current device status is less than a preset status parameter, controlling the component in the electronic device to execute the operation corresponding to the running mode.

In still another implementation of the aspect, the current component status includes at least one of the following: a chip temperature, a hardware resource occupation status, and a consumed battery quantity.

According to another aspect, an embodiment of the present invention further provides an electronic device control apparatus, including:

a processing module, configured to: determine a running mode of a current running application in an electronic device; and control, based on the running mode, a component in the electronic device to execute an operation corresponding to the running mode, where the component includes a component required for running the current running application.

In an implementation of the another aspect, the processing module is specifically configured to: determine whether the current running application in the electronic device is an application of a preset type; and if the current running application is an application of the preset type, determine the running mode of the current running application in the electronic device.

In another implementation of the another aspect, the processing module is specifically configured to: determine, based on an engine identifier of the current running application, whether an engine of the current running application is an engine of the application of the preset type; and if the engine of the current running application is the engine of the application of the preset type, determine that the current running application is the application of the preset type; or if the engine of the current running application is not the engine of the application of the preset type, determine that the current running application is not the application of the preset type.

In still another implementation of the another aspect, the processing module is specifically configured to: determine, based on a type identifier of the current running application, whether the current running application is the application of the preset type; and if the current running application is the application of the preset type, determine that the current running application is the application of the preset type; or if the current running application is not the application of the preset type, determine that the current running application is not the application of the preset type.

In still another implementation of the another aspect, the processing module is specifically configured to: determine whether the current running application is an application in a preset application list; and if the current running application is the application in the preset application list, determine that the current running application is the application of the preset type; or if the current running application is not the application in the preset application list, determine that the current running application is not the application of the preset type.

In still another implementation of the another aspect, the processing module is specifically configured to: determine, based on vendor information of the current running application, whether the current running application is an application of a preset vendor; and if the current running application is the application of the preset vendor, determine that the current running application is the application of the preset type; or if the current running application is not the application of the preset vendor, determine that the current running application is not the application of the preset type.

In still another implementation of the another aspect, the processing module is specifically configured to execute at least one of the following operations:

controlling a voice device of the electronic device to turn off or turn down volume;
controlling a display screen of the electronic device to reduce resolution;
controlling the display screen to reduce a frame rate;
controlling the display screen to scale down a display window;
controlling the display screen to reduce display luminance;
controlling a processor of the electronic device to reduce image rendering quality;
controlling the processor to reduce a working frequency; and
controlling a random access memory of the electronic device to reduce a working frequency.

In still another implementation of the another aspect, the processing module is specifically configured to: detect a current device status of the electronic device; and when a detection module detects that the current component status is greater than or equal to a preset status parameter, control the component in the electronic device to execute the operation corresponding to the running mode.

In still another implementation of the another aspect, the processing module is specifically configured to execute at least one of the following operations:

controlling a voice device of the electronic device to turn on or turn up volume;
controlling a display screen of the electronic device to increase resolution;
controlling the display screen to increase a frame rate;
controlling the display screen to scale up a display window;
controlling the display screen to increase display luminance;
controlling a processor of the electronic device to improve image rendering quality;
controlling the processor to increase a working frequency; and
controlling a random access memory of the electronic device to increase a working frequency.

In still another implementation of the another aspect, the processing module is specifically configured to: detect a current device status of the electronic device; and when a detection module detects that the current device status is less than a preset status parameter, control the component in the electronic device to execute the operation corresponding to the running mode.

According to still another aspect, an embodiment of the present invention further provides an electronic device, including a processor and a memory, where the processor is connected to the memory;

the memory is configured to store program code; and
the processor is configured to invoke the program code in the memory, to enable the processor to perform any electronic device control method in the foregoing.

According to the electronic device control method and apparatus, and the electronic device provided in the embodiments of the present invention, the running mode of the current running application in the electronic device may be determined, and the component in the electronic device is controlled based on the running mode, to execute the operation corresponding to the running mode. The component includes a component required for running the current running application. In the method, the component in the electronic device may be controlled based on the running mode of the current running application, to execute the operation corresponding to the running mode, and a user requirement of an application may match component power consumption of a device when a user requirement of a current running application in the running mode is met, to avoid high power consumption of the electronic device that is caused because a user requirement is blindly improved, and reduce power consumption of the electronic device, thereby improving a battery life of the electronic device.

DESCRIPTION OF EMBODIMENTS

According to an electronic device control method provided in the following embodiments of the present invention, a user requirement of an application in a running mode is determined, and a component in an electronic device is controlled based on a running mode of a current running application in the electronic device, to execute an operation corresponding to the running mode of the application, so that the component required for running the application in the electronic device can execute an operation based on an actual user requirement of the application, and component power consumption of the electronic device matches the user requirement of the application. Therefore, power consumption can be reduced, and a battery life of the electronic device can be improved when the user requirement of the application is met.

The component may include a component required for running the application in the electronic device. For example, the component may include at least one of the following: a voice device, a display screen, a processor, a memory, and the like of the electronic device. The voice device may include, for example, a speaker (Speaker) of the electronic device. The processor may include at least one of a central processing unit (Central Processing Unit, CPU for short), a graphics processing unit (Graphic Processing Unit, GPU for short), and the like of the electronic device. The memory may include, for example, a random access memory (Random Access Memory, RAM for short) of the electronic device.

It should be noted that the electronic device involved in the following embodiments of the present invention may be any electronic device in which an application can be installed, such as a mobile phone, a tablet computer, or a notebook computer. The application involved in the following embodiments of the present invention may be any type of application such as a multimedia application. For example, the multimedia application may include, for example, at least one of a photography application, an image processing application, an audio and video application, and a game application.

Figure 1:
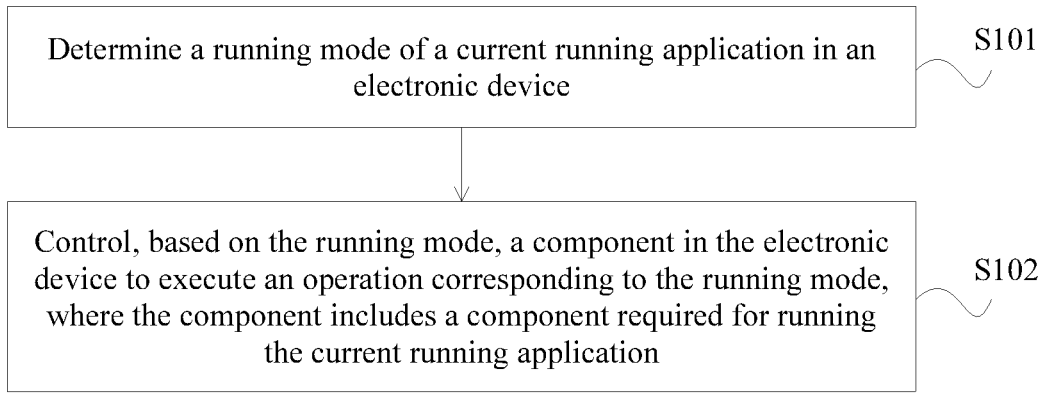
FIG. 1 is a flowchart of an electronic device control method according to Embodiment 1 of the present invention.

Embodiment 1 of the present invention provides an electronic device control method. The electronic device control method may be performed by an electronic device in a manner of software and/or hardware. FIG. 1 is a flowchart of an electronic device control method according to Embodiment 1 of the present invention. As shown in FIG. 1, the method may include the following steps.

S101. Determine a running mode of a current running application in an electronic device.

Specifically, the current running application may be an application running in a foreground of the electronic device. The running mode may further be a mode of running the current running application by simulating an operation of a component in the electronic device, for example, a mode of running the current running application by simulating an operation that an input component receives a user instruction. The running mode may further include, for example, at least one of the following: a hang-up running mode, another user-defined running mode, and the like. The running mode may be a mode of running the current running application by using an actual operation of a component in the electronic device, for example, a mode of running the current running application by using an actual operation of a processor or a charging component. The running mode may include, for example, at least one of the following: a detection running mode, a charging running mode, another user-defined running mode, and the like.

The hang-up running mode may be referred to as a running mode without a user instruction. In the hang-up running mode, a user does not need to pay attention for a long time, and an application may automatically run without an instruction delivered by the user, for example, in scenarios of participating in an instance, leveling up, killing a monster, and the like in a game application.

The detection running mode may be an intelligent identification mode of the electronic device. In the detection running mode, the electronic device performs detection on a current component status, and determines whether the current component status meets a preset condition.

The charging running mode may be a mode in which the current running application runs when the electronic device is in a charging state.

S102. Control, based on the running mode, a component in the electronic device to execute an operation corresponding to the running mode, where the component includes a component required for running the current running application.

User requirements for the application vary with running modes. To meet a user requirement, the component required for running the application in the electronic device needs to execute a corresponding operation. Therefore, the component in the electronic device is controlled based on the running mode, to execute the operation corresponding to the running mode, so as to meet the user requirement for the application in the running mode.

In addition, the component in the electronic device executes the operation corresponding to the running mode, so that component power consumption of the electronic device actually is power consumption corresponding to the user requirement for the application in the running mode. Therefore, the user requirement of the application matches the component power consumption.

The following provides description in detail with reference to a plurality of instances.

In an implementation, the controlling, based on the running mode, a component in the electronic device to execute an operation corresponding to the running mode in S102 may include at least one of the following, to reduce running resources of the current running application in the electronic device:

controlling a voice component of the electronic device to turn off or turn down volume;

controlling a display screen of the electronic device to reduce resolution;

controlling the display screen to reduce a frame rate;

controlling the display screen to scale down a display window;

controlling the display screen to reduce display luminance;

controlling a processor of the electronic device to reduce image rendering quality;

controlling the processor to reduce a working frequency; and controlling a random access memory of the electronic device to reduce a working frequency.

Specifically, the voice component of the electronic device may include, for example, components such as a speaker and a headset connected to the electronic device. In the method, the voice component of the electronic device may be controlled to turn off the volume, or the voice component may be controlled to turn down the volume from first volume to second volume. The first volume may be current volume.

In the method, the display screen may be controlled based on resolution supported by the display screen, to reduce the resolution from first resolution to second resolution. The first resolution may be current resolution of the display screen of the application in the running mode, and the second resolution may be less than the first resolution. The resolution supported by the display screen may include 2 k, 1080 p, 720 p, and the like in descending order. For example, if the first resolution is 2 k, the second resolution may be, for example, any one of 1080 p, 720 p, or other lower resolution.

In the method, the display screen may be controlled based on a frame rate supported by the display screen, to reduce the resolution from a first frame rate to a second frame rate. The first frame rate may be a current frame rate of the display screen of the application in the running mode, and the second frame rate may be less than the first frame rate. The frame rate supported by the display screen may include 60 fps, 50 fps, 40 fps, 30 fps, and the like in descending order. For example, the first frame rate is 60 fps, and the second frame rate may be, for example, any one of 50 fps, 40 fps, 30 fps, or another lower frame rate.

In the method, the display screen may be controlled to scale down the display window from a first window size to a second window size. The first window size may be a size of a current display window of the display screen of the application in the running mode, and the second window size may be less than the first window size. A size of the display window of the display screen may be a proportion occupied by an area of the display window in a display area of the display screen, and the size of the display window of the display screen may include 100%, 90%, 80%, 70%, and the like in descending order. For example, the first window size is 100%, and the second window size may be, for example, any one of 90%, 80%, 70%, or another smaller window size.

In the method, the display screen may be controlled to reduce the display luminance from a first luminance value size to a second luminance value. The first luminance value may be current display luminance of the display screen of the application in the running mode, and the second luminance value may be less than the first luminance value. The current display luminance value of the display screen may be a ratio of current luminance to maximum luminance of the display screen, and the display luminance of the display screen may include 100%, 90%, 80%, 70%, and the like in descending order. For example, the first window size is 90%, and the second window size may be, for example, any one of 80%, 70%, or other lower display luminance.

In the method, the processor may be controlled to reduce a sampling rate of image rendering from a first sampling rate to a second sampling rate, to reduce the image rendering quality. The first sampling rate may be a current sampling rate of the image rendering of the application in the running mode, and the second sampling rate may be less than the first sampling rate. The current sampling rate of the image rendering may be a ratio of pixels currently sampled in the image rendering to total pixels of a current interface of the application, and the sampling rate of the image rendering may include 100%, 90%, 80%, 70%, and the like in descending order. For example, the first sampling rate is 90%, and the first sampling rate may be, for example, any one of 80%, 70%, or another lower sampling rate. It should be noted that the processor may include a CPU and/or a GPU.

In the method, the processor may be controlled to reduce the working frequency from a first frequency to a second frequency. The first frequency may be a current working frequency of the processor of the application in the running mode, and the second frequency may be less than the first frequency.

In the method, the random access memory may be controlled to reduce the working frequency from a first frequency to a second frequency. The first frequency may be a current working frequency of the random access memory of the application in the running mode, and the second frequency may be less than the first frequency.

It should be noted that an adjustment parameter of each component in the electronic device in the running mode may be determined based on adjustment configuration information entered by the user. In other words, in the running mode, target volume that needs to be adjusted by the voice device of the electronic device, for example, a specific parameter of the second volume, may be determined based on the adjustment configuration information entered by the user. Target resolution required by the display screen of the electronic device, for example, the second resolution, may also be determined based on the adjustment configuration information entered by the user. A target frame rate required by the display screen of the electronic device, for example, the second frame rate, may also be determined based on the adjustment configuration information entered by the user. A target window size required by the display screen of the electronic device, for example, the second window size, may also be determined based on the adjustment configuration information entered by the user. A target luminance value required by the display screen of the electronic device, for example, the second luminance value, may also be determined based on the adjustment configuration information entered by the user. A target sampling rate required by the processor of the electronic device, for example, a fourth sampling rate, may also be determined based on the adjustment configuration information entered by the user. A target working frequency required by the processor of the electronic device, for example, a fourth working frequency, may also be determined based on the adjustment configuration information entered by the user. A target working frequency required by the random access memory of the electronic device, for example, the second working frequency, may also be determined based on the adjustment configuration information entered by the user.

Optionally, when the running mode is the hang-up running mode, in the method, the component in the electronic device in the implementation may be controlled, to reduce running resources of the current running application in the electronic device.

For example, if the running mode is the hang-up running mode, it is determined that the running mode of the current running application may be implemented in any one of the following manners:

learning, based on a device interface invoked by an application layer of the current running application, that the running mode of the current running application is the hang-up running mode;

controlling, based on an entered instruction, the running mode of the current running application to be the hang-up running mode, where the instruction may be an instruction for a preset hang-up button and/or a preset physical button;

when the mode of the electronic device is determined as a pocket mode based on light and data of a gyro sensor, controlling the running mode of the current running application to be the hang-up running mode; or if no entered application running instruction is received within a first preset time period, and it is determined based on data of a gyro sensor that a status of the electronic device does not change within the first preset time period, controlling the running mode of the current running application to be the hang-up running mode.

Specifically, when no entered instruction is received within the first preset time period, and it is determined based on the data of the gyro sensor that the status of the electronic device does not change within the first preset time period, the electronic device may send prompt information to the user, for example, in a voice or display manner; if a hang-up acknowledgement instruction entered by the user is received, control the running mode of the current running application to be the hang-up running mode; and if no hang-up acknowledgement instruction entered by the user is received within the second preset time period, control the running mode of the current running application to be the hang-up running mode. The first preset time period may be referred to as a hang-up detection time, and the second preset time period may be referred to as an acknowledgement waiting time. Specific values of the first preset time period and the second preset time period may be determined based on configuration information entered by the user. For example, the first preset time period may be, for example, any one of 20 s to 200 s, and the second preset time period may be, for example, any one of 5 s to 60 s.

If the running mode is the detection running mode, the controlling, based on the running mode, a component in the electronic device to execute an operation corresponding to the running mode in S102 may include:

detecting a current component status of the electronic device; and when the current component status is greater than or equal to a preset status parameter, controlling the component in the electronic device to execute the operation corresponding to the running mode.

The detection running mode may also be referred to as an intelligent running mode.

In the detection running mode, the electronic device may detect the current component status of the electronic device, and compare the current component status with the preset status parameter. If the current component status is greater than or equal to the preset status parameter, the component in the electronic device in the foregoing implementation may be controlled, to reduce running resources of the current running application in the electronic device.

Optionally, the current component status includes at least one of the following: a chip temperature, a hardware resource occupation status, and a consumed battery quantity.

The chip temperature may be a temperature of at least one component in the electronic device such as a CPU or a GPU. The hardware resource occupation status may include an occupation status of any hardware resource such as a CPU, a GPU, a RAM, or a memory. The consumed battery quantity may be a consumed battery quantity of a battery.

For example, if the chip temperature is greater than or equal to a first preset temperature value, it may be determined that a temperature of the electronic device is relatively high, and therefore the component in the electronic device in the foregoing implementation may be controlled to reduce running resources of the current running application in the electronic device. It should be noted that, if the chip temperature is greater than or equal to a second preset temperature value in the current device status, the current running application may further stop running in the method. The second preset temperature value is greater than the first preset temperature value.

If a hardware resource corresponding to the hardware resource occupation status is greater than or equal to a preset resource value, it may be determined that the electronic device is short of hardware resources, and therefore the component in the electronic device in the foregoing implementation may be controlled to reduce running resources of the current running application in the electronic device.

If the consumed battery quantity is greater than or equal to a preset battery quantity, it may be determined that a battery quantity of the electronic device is insufficient, and therefore the component in the electronic device in the foregoing implementation may be controlled to reduce running resources of the current running application in the electronic device.

According to the electronic device control method, in the hang-up running mode or in the detection running mode, at least one step in the foregoing implementation may be performed to reduce running resources of the current running application in the electronic device, thereby effectively controlling power consumption of the electronic device.

In another implementation, the controlling, based on the running mode, a component in the electronic device to execute an operation corresponding to the running mode in S102 may include at least one of the following, to increase running resources of the current running application in the electronic device:

controlling a voice component of the electronic device to turn on or turn up volume;

controlling a display screen of the electronic device to increase resolution;

controlling the display screen to increase a frame rate;

controlling the display screen to scale up a display window;

controlling the display screen to increase display luminance;

controlling a processor of the electronic device to improve image rendering quality; and controlling the processor and/or a random access memory of the electronic device to increase a working frequency.

Specifically, in the method, the voice component of the electronic device is controlled to turn on the volume, or the voice component is controlled to turn up the volume from third volume to fourth volume.

In the method, the display screen may be controlled based on resolution supported by the display screen, to increase the resolution from third resolution to fourth resolution. The third resolution may be current resolution of the display screen when the application is in the running mode, and the fourth resolution may be greater than the third resolution. The resolution supported by the display screen may include 2 k, 1080 p, 720 p, and the like in descending order. For example, if the third resolution is 720 k, the fourth resolution may be, for example, any one of 2 k, 1080 p, or other higher resolution.

In the method, the display screen may be controlled based on a frame rate supported by the display screen, to increase the resolution from a third frame rate to a fourth frame rate. The third frame rate may be a current frame rate of the display screen when the application is in a second running mode, and the fourth frame rate may be greater than the third frame rate. The frame rate supported by the display screen may include 60 fps, 50 fps, 40 fps, 30 fps, and the like in descending order. For example, the third frame rate is 40 fps, and the fourth frame rate may be, for example, any one of 60 fps, 50 fps, or the like.

In the method, the display screen may be controlled to scale up the display window from a third window size to a fourth window size. The third window size may be a size of a current display window of the display screen when the application is in the running mode, and the fourth window size may be greater than the third window size. A size of the display window of the display screen may be a proportion occupied by an area of the display window in a display area of the display screen, and the size of the display window of the display screen may include 100%, 90%, 80%, 70%, and the like in descending order. For example, the third window size is 80%, and the fourth window size may be, for example, any one of 100%, 90%, or the like.

In the method, the display screen may be controlled to increase the display luminance from a third luminance value size to a fourth luminance value. The third luminance value may be current display luminance of the display screen when the application is in the running mode, and the fourth luminance value may be greater than the third luminance value. The current display luminance value of the display screen may be a ratio of current luminance to maximum luminance of the display screen, and the display luminance of the display screen may include 100%, 90%, 80%, 70%, and the like in descending order. For example, the third window size is 80%, and the fourth window size may be, for example, any one of 90%, 100%, or the like.

In the method, the processor may be controlled to increase a sampling rate of image rendering from a third sampling rate to a fourth sampling rate, to improve the image rendering quality. The third sampling rate may be a current sampling rate of the image rendering when the application is in the running mode, and the fourth sampling rate may be greater than the third sampling rate. The current sampling rate of the image rendering may be a ratio of pixels currently sampled in the image rendering to total pixels of a current interface of the application, and the sampling rate of the image rendering may include 100%, 90%, 80%, 70%, and the like in descending order. For example, the third sampling rate is 80%, and the fourth sampling rate may be, for example, any one of 90%, 100%, or the like.

In the method, the processor may be controlled to increase the working frequency from a third frequency to a fourth frequency. The third frequency may be a current working frequency of the processor when the application is in the running mode, and the fourth frequency may be greater than the third frequency.

In the method, the random access memory may be controlled to increase the working frequency from a third frequency to a fourth frequency. The third frequency may be a current working frequency of the random access memory when the application is in the running mode, and the fourth frequency may be greater than the third frequency.

It should be noted that target volume that needs to be adjusted by the voice device of the electronic device, for example, a specific parameter of the fourth volume, may be determined based on adjustment configuration information entered by the user. Target resolution required by the display screen of the electronic device, for example, the fourth resolution, may also be determined based on the adjustment configuration information entered by the user. A target frame rate required by the display screen of the electronic device, for example, the fourth frame rate, may also be determined based on the adjustment configuration information entered by the user. A target window size required by the display screen of the electronic device, for example, the fourth window size, may also be determined based on the adjustment configuration information entered by the user. A target luminance value required by the display screen of the electronic device, for example, the fourth luminance value, may also be determined based on the adjustment configuration information entered by the user. A target sampling rate required by the processor of the electronic device, for example, the fourth sampling rate, may also be determined based on the adjustment configuration information entered by the user. A target working frequency required by the processor of the electronic device, for example, the fourth working frequency, may also be determined based on the adjustment configuration information entered by the user. A target working frequency required by the random access memory of the electronic device, for example, a fourth working frequency, may also be determined based on the adjustment configuration information entered by the user.

Optionally, when the running mode is the charging running mode, in the method, the component in the electronic device in the another implementation may be controlled to increase running resources of the current running application of the electronic device.

Specifically, the running mode is the charging running mode, in other words, the electronic device is in a charging state. In this case, the electronic device has a sufficient battery quantity, and therefore, the component in the electronic device may be controlled to execute the operation corresponding to the running mode, to increase running resources of the current running application of the electronic device, thereby ensuring a user requirement of the application.

It should be noted that, in the charging running mode, the target volume that needs to be adjusted by the voice component of the electronic device may be maximum volume of the voice device; the target resolution required by the display screen of the electronic device may be maximum resolution supported by the display screen; the target frame rate required by the display screen of the electronic device may be a maximum frame rate supported by the display screen; the target window size required by the display screen of the electronic device may be a maximum window size supported by the display screen; the target luminance value required by the display screen of the electronic device may be a maximum luminance value supported by the display screen; the target sampling rate required by the processor of the electronic device may be a maximum sampling rate; the target working frequency required by the processor of the electronic device may be a maximum working frequency of the processor; and the target working frequency required by the random access memory of the electronic device may be a maximum working frequency of the random access memory.

Optionally, when the running mode is a hang-up running exit mode, a user requirement of the application in the running mode is improved. Therefore, to meet the user requirement, in the method, the component in the electronic device in the another implementation may be controlled to increase running resources of the current running application of the electronic device.

For example, if the running mode is the hang-up running exit mode, it is determined that the running mode of the current running application may be implemented in any one of the following manners:

determining, based on a device interface invoked by an application layer of the current running application, that the current running application exits the hang-up running mode;

controlling, based on an entered instruction, the running mode of the current running application to exit the hang-up running mode, where the instruction may be an instruction for a preset hang-up button and/or a preset physical button;

when it is determined based on light and data of a gyro sensor that the electronic device has exited a pocket mode, controlling the current running application to exit the hang-up running mode; or after an application running instruction entered by the user is received, and/or it is determined based on data of a gyro sensor that the status of the electronic device changes, controlling the current running application to exit the hang-up running mode.

If the running mode is the detection running mode, the controlling, based on the running mode, a component in the electronic device to execute an operation corresponding to the running mode in S102 may include:

detecting a current component status of the electronic device; and when the current component status is less than a preset status parameter, controlling the component in the electronic device to execute the operation corresponding to the running mode.

In the detection running mode, if the current component status is less than the preset status parameter, the component in the electronic device in the another implementation may be controlled to increase running resources of the current running application of the electronic device, thereby meeting improvement of the user requirement for the application.

Optionally, the current component status includes at least one of the following: a chip temperature, a hardware resource occupation status, and a consumed battery quantity.

For example, if the chip temperature is less than a first preset temperature value, it may be determined that a temperature of the electronic device is relatively low, and therefore the component in the electronic device in the another implementation may be controlled to increase running resources of the current running application in the electronic device.

If a hardware resource corresponding to the hardware resource occupation status is less than a preset resource value, it may be determined that the electronic device has sufficient hardware resources, and therefore the component in the electronic device in the another implementation may be controlled to increase running resources of the current running application in the electronic device.

If the consumed battery quantity is less than a preset battery quantity, it may be determined that a battery quantity of the electronic device is sufficient, and therefore the component in the electronic device in the another implementation may be controlled to increase running resources of the current running application in the electronic device.

According to the electronic device control method, in the charging running mode or in the detection running mode, at least one step in the another implementation may be performed to increase running resources of the current running application in the electronic device, thereby effectively ensuring the user requirement of the current running application.

It should be noted that the running mode may alternatively be a default running mode, another running mode, or the like. The user-defined running mode may include a performance priority mode, a power consumption priority mode, or the like. In the default running mode or in the another running mode, a specific parameter of the target volume that needs to be adjusted by the voice component of the electronic device, the target resolution required by the display screen, the target frame rate of the display screen, the target window size required by the display screen, the target luminance value required by the display screen, the target sampling rate required by the processor, the target working frequency required by the processor, the target working frequency required by the random access memory, and the like may be determined based on the adjustment configuration information entered by the user. In the power consumption priority mode, in the method, the electronic device may be controlled in a manner similar to that in the foregoing implementation, to reduce running resources of the current application in the device. In the performance priority mode, in the method, the electronic device may be controlled in a manner similar to that in the another implementation, to increase running resources of the current application in the device. Details are not described herein again.

According to the electronic device control method provided in Embodiment 1 of the present invention, the running mode of the current running application in the electronic device may be determined, and the component in the electronic device is controlled based on the running mode, to execute the operation corresponding to the running mode. The component includes a component required for running the current running application. In the method, the component in the electronic device may be controlled based on the running mode of the current running application, to execute the operation corresponding to the running mode, and component power consumption of the electronic device may match the user requirement of the application when the user requirement of the current running application in the running mode is met, to avoid high power consumption of the electronic device that is caused because an application requirement is blindly improved, and reduce power consumption of the electronic device, thereby improving a battery life of the electronic device.

Figure 2:
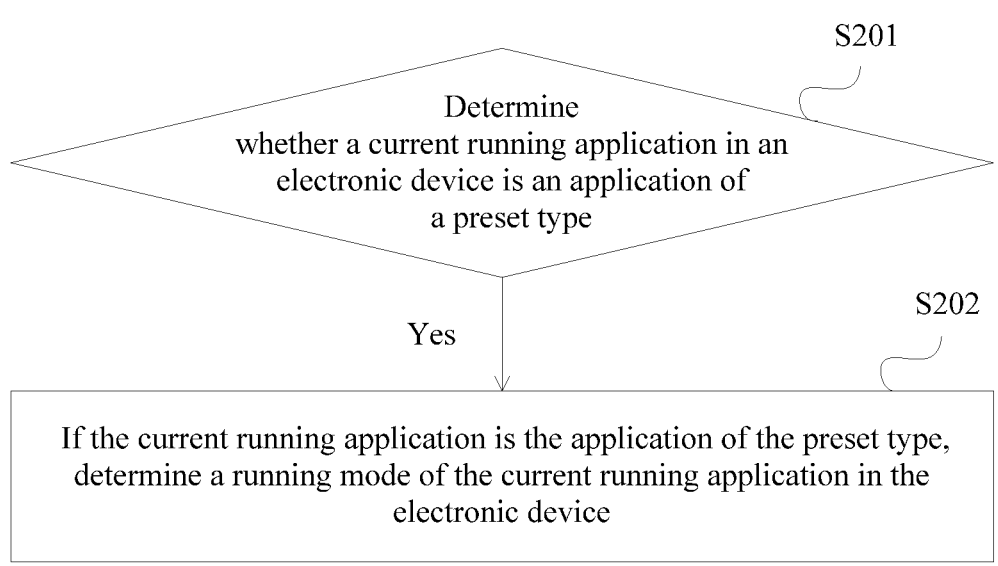
FIG. 2 is flowchart 1 of a method for determining an application of a preset type in an electronic device control method according to Embodiment 2 of the present invention.

Optionally, Embodiment 2 of the present invention may further provide an electronic device control method. FIG. 2 is flowchart 1 of a method for determining an application of a preset type in an electronic device control method according to Embodiment 2 of the present invention. As shown in FIG. 2, the determining a running mode of a current running application in an electronic device in S101 according to the electronic device control method may include the following steps.

S201. Determine whether the current running application in the electronic device is an application of a preset type.

Specifically, the application of the preset type may include a multimedia application of at least one of the following types: a photography application, an image processing application, an audio and video application, a game application, and the like. In S201, a type of the current running application may be determined, and then whether the type of the current running application is an application type in the preset type is determined. If the type of the current running application is the application type in the preset type, it may be determined that the current running application is the application of the preset type; or if the type of the current running application is not the application type in the preset type, it may be determined that the current running application is not the application of the preset type.

S202. If the current running application is the application of the preset type, determine the running mode of the current running application in the electronic device.

If the current running application is not the application of the preset type, steps in the electronic device control method do not need to be performed.

According to the electronic device control method, the current running application that is the application of the preset type may be controlled in the electronic device, while running applications of all types in the electronic device do not need to be controlled, so that control on the electronic device can be more accurate and more effective.

Figure 3:
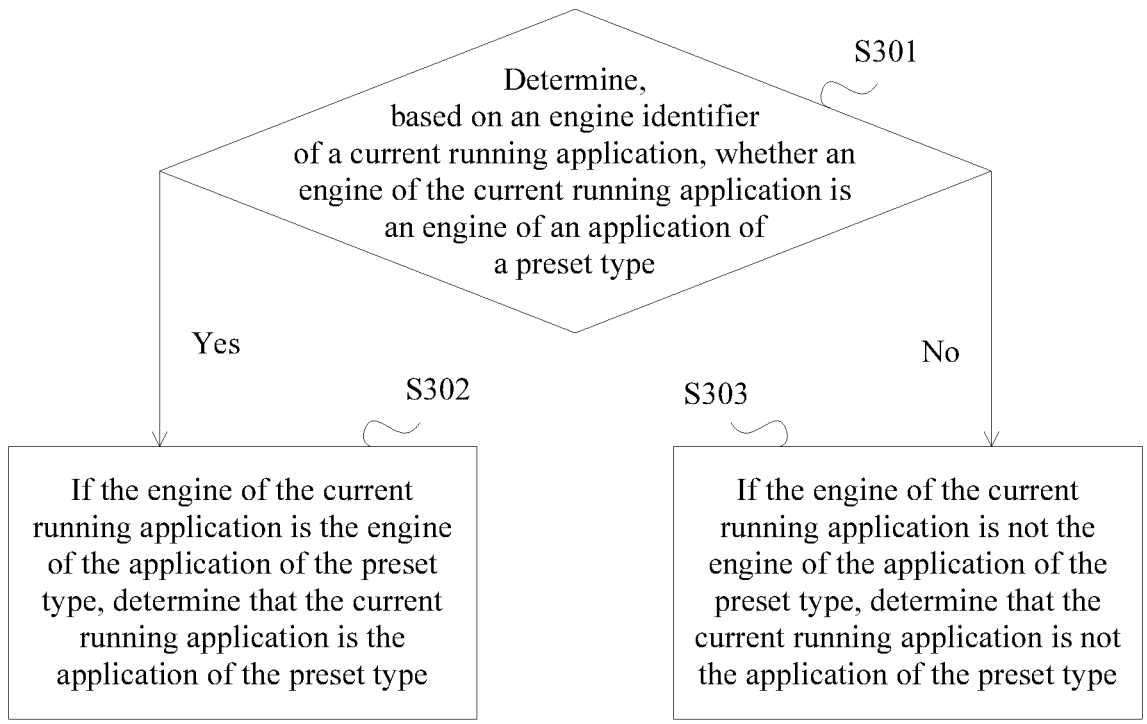
FIG. 3 is flowchart 2 of a method for determining an application of a preset type in an electronic device control method according to Embodiment 2 of the present invention.

Optionally, Embodiment 2 of the present invention may further provide an electronic device control method. FIG. 3 is flowchart 2 of a method for determining an application of a preset type in an electronic device control method according to Embodiment 2 of the present invention. As shown in FIG. 3, the determining whether the current running application in the electronic device is an application of a preset type in S201 may include the following steps.

S301. Determine, based on an engine identifier of the current running application, whether an engine of the current running application is an engine of the application of the preset type.

The engine of the current running application may be an engine used to compile the current running application in an application development platform, and the engine may also be referred to as a compiler core component. The engine identifier of the current running application may be an identifier of a compiler engine corresponding to the current running application. The engine of the application of the preset type may include, for example, a compiler engine in the application development platform such as cocos or unity. In the method, whether the engine identifier of the current running application is the engine identifier of the application of the preset type may be determined. If the engine identifier of the current running application is the engine identifier of the application of the preset type, it is determined that the engine of the current running application is the engine of the application of the preset type; or if the engine identifier of the current running application is not the engine identifier of the application of the preset type, it is determined that the engine of the current running application is not the engine of the application of the preset type.

For example, the engine identifier of the current running application may be determined based on attribute information of the current running application, or may be an engine identifier of the current running application that is obtained after a request is sent in an open source collaboration manner to a server corresponding to the compiler engine of the current running application. The foregoing implementation of obtaining the engine identifier of the current running application is merely an instance. The present invention is not limited thereto.

S302. If the engine of the current running application is the engine of the application of the preset type, determine that the current running application is the application of the preset type.

S303. If the engine of the current running application is not the engine of the application of the preset type, determine that the current running application is not the application of the preset type.

Figure 4:
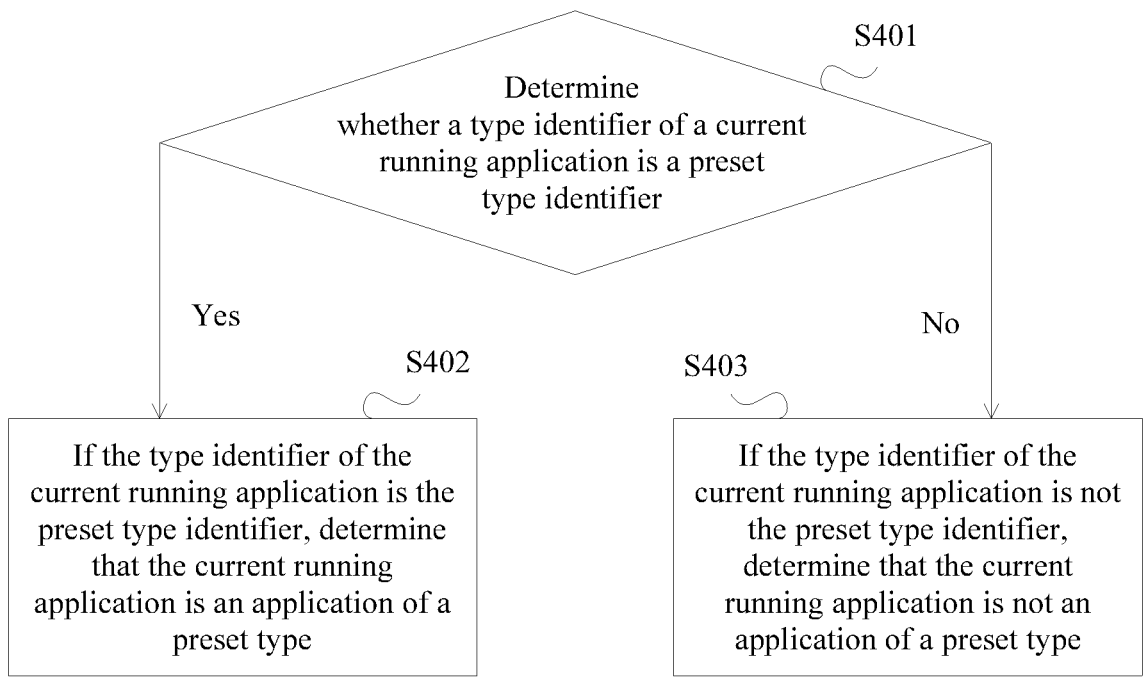
FIG. 4 is flowchart 3 of a method for determining an application of a preset type in an electronic device control method according to Embodiment 2 of the present invention.

Optionally, Embodiment 2 of the present invention may further provide an electronic device control method. FIG. 4 is flowchart 3 of a method for determining an application of a preset type in an electronic device control method according to Embodiment 2 of the present invention. As shown in FIG. 4, the determining whether the current running application in the electronic device is an application of a preset type in S201 may include the following steps.

S401. Determine whether a type identifier of the current running application is a preset type identifier.

Specifically, the type identifier of the current running application may be a type identifier of the current running application in an application program store (APP store). For example, the type identifier of the current running application may be obtained when the electronic device downloads an installation file of the current running application from the application program store.

The preset type identifier may include: a type identifier of a photography application, a type identifier of an image processing application, a type identifier of an audio and video application, and a type identifier of a game application. For example, the type identifier of the photography application may be represented by using a text "photography", or represented by using a photography icon, or the like. For example, the type identifier of the image processing application may be represented by using a text "image", or represented by using an image processing icon, or the like. For example, the type identifier of the audio and video application may be represented by using a text "audio and video", or represented by using an audio and video icon, or the like. For example, the type identifier of the game application may be represented by using a text "game", or represented by using a game icon, or the like.

For example, if the type identifier of the current running application is an identifier of the game application, it may be determined that the current running application is the game application.

S402. If the type identifier of the current running application is the preset type identifier, determine that the current running application is the application of the preset type.

S403. If the type identifier of the current running application is not the preset type identifier, determine that the current running application is not the application of the preset type.

Figure 5:
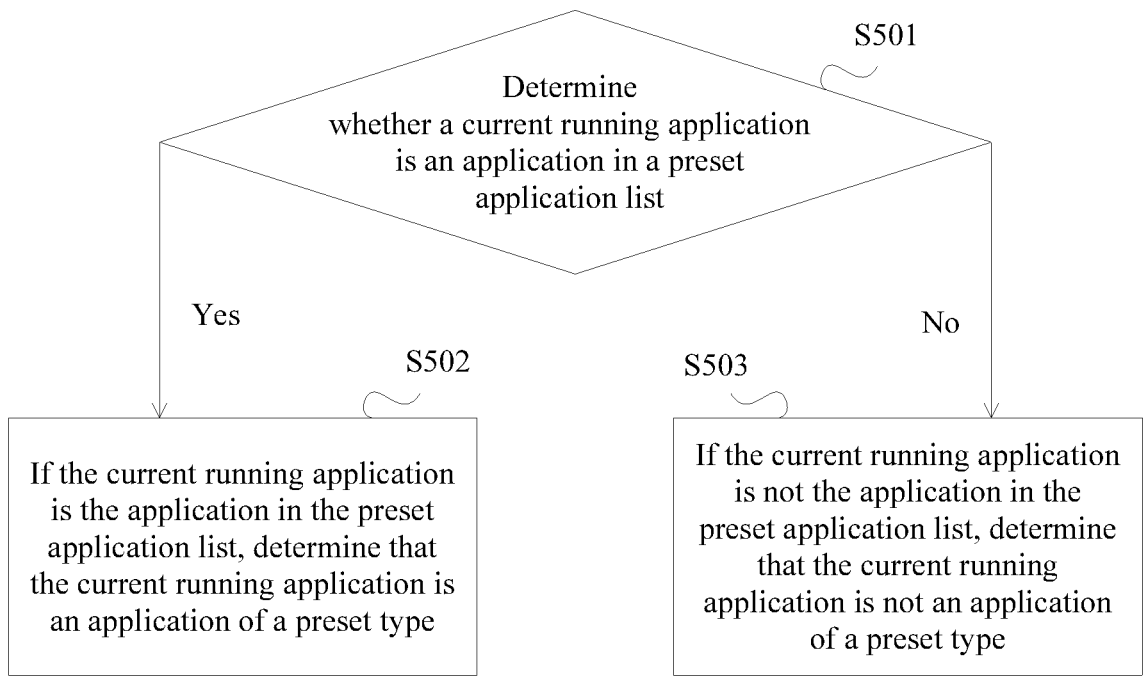
FIG. 5 is flowchart 4 of a method for determining an application of a preset type in an electronic device control method according to Embodiment 2 of the present invention.

Optionally, Embodiment 2 of the present invention may further provide an electronic device control method. FIG. 5 is flowchart 4 of a method for determining an application of a preset type in an electronic device control method according to Embodiment 2 of the present invention. As shown in FIG. 5, the determining whether the current running application in the electronic device is an application of a preset type in S201 may include the following steps.

S501. Determine whether the current running application is an application in a preset application list.

Specifically, in the method, whether an identifier of the current running application, for example, a name of the current running application, is an identifier of the application in the preset application list may be determined. If the identifier of the current running application is the identifier of the application in the preset application list, it is determined that the current running application is the application in the preset application list; or if the identifier of the current running application is not the identifier of the application in the preset application list, it is determined that the current running application is not the application in the preset application list. The preset application list may be an application list pre-stored in the electronic device. The preset application list may include an identifier of at least one application. The preset application list may be an application list that is determined by using list configuration information that is entered by a user on a settings interface, or may be an application list pushed by a cloud server. The preset application list may also be referred to as an application whitelist entered by the user.

S502. If the current running application is the application in the preset application list, determine that the current running application is the application of the preset type.

S503. If the current running application is not the application in the preset application list, determine that the current running application is not the application of the preset type.

Figure 6:
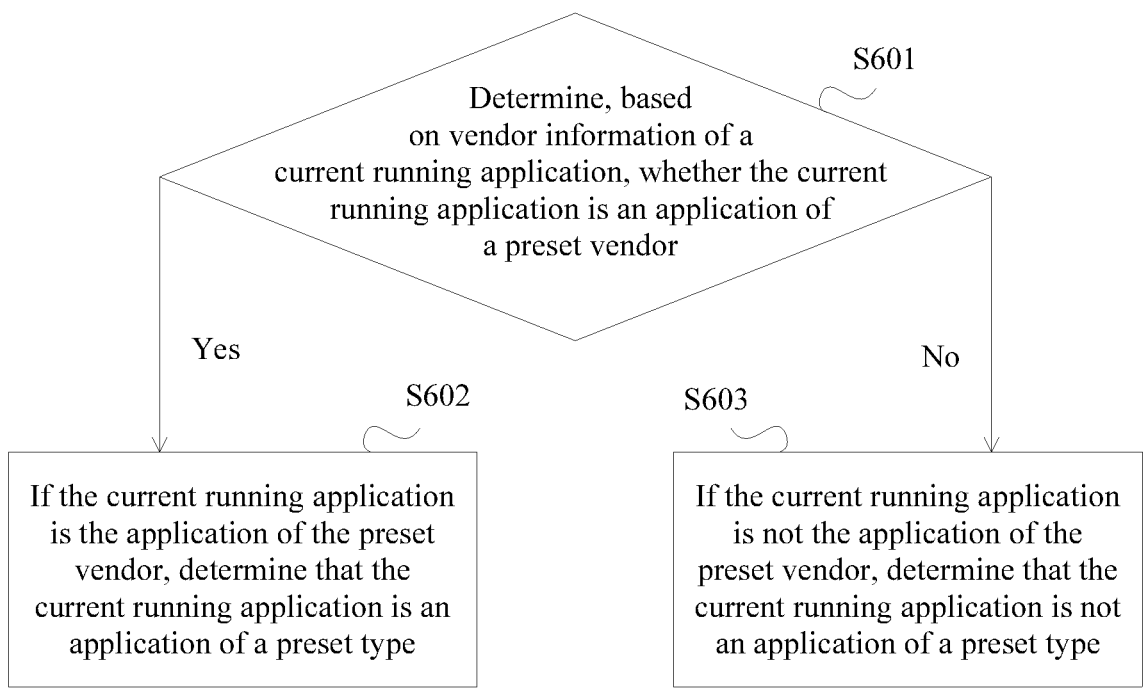
FIG. 6 is flowchart 5 of a method for determining an application of a preset type in an electronic device control method according to Embodiment 2 of the present invention.

Optionally, Embodiment 2 of the present invention may further provide an electronic device control method. FIG. 6 is flowchart 5 of a method for determining an application of a preset type in an electronic device control method according to Embodiment 2 of the present invention. As shown in FIG. 6, the determining whether the current running application in the electronic device is an application of a preset type in S201 includes the following steps.

S601. Determine, based on vendor (Vendor) information of the current running application, whether the current running application is an application of a preset vendor.

Specifically, the vendor information of the current running application may be determined based on attribute information of the current running application. In the method, a vendor of the current running application may be determined based on the vendor information of the current running application, and whether the vendor of the current running application is the preset vendor may be determined. If the vendor of the current running application is the preset vendor, it is determined that the running application is the application of the preset vendor; or if the vendor of the current running application is not the preset vendor, it is determined that the running application is not the application of the preset vendor.

S602. If the current running application is the application of the preset vendor, determine that the current running application is the application of the preset type.

S603. If the current running application is not the application of the preset vendor, determine that the current running application is not the application of the preset type.

According to the electronic device control method provided in Embodiment 2 of the present invention, a plurality of implementations for determining whether the current running application is the application of the preset type are provided, so that the electronic device control method has more implementation scenarios, power consumption of the electronic device is reduced in many scenarios, and a battery life of the electronic device is improved.

Figure 7A:
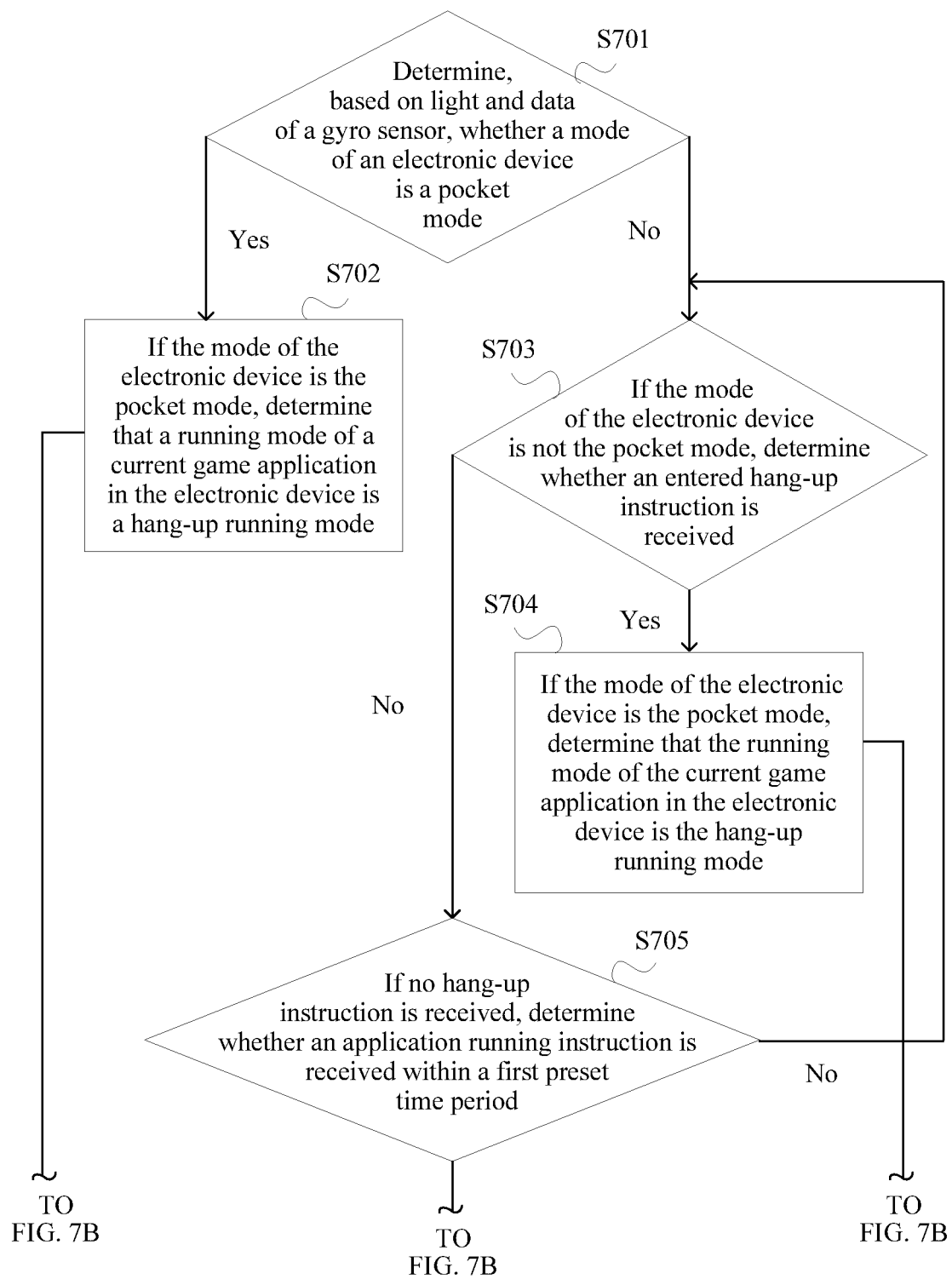
FIG. 7A and FIG. 7B are a flowchart of an electronic device control method according to Embodiment 3 of the present invention.
Figure 7B:
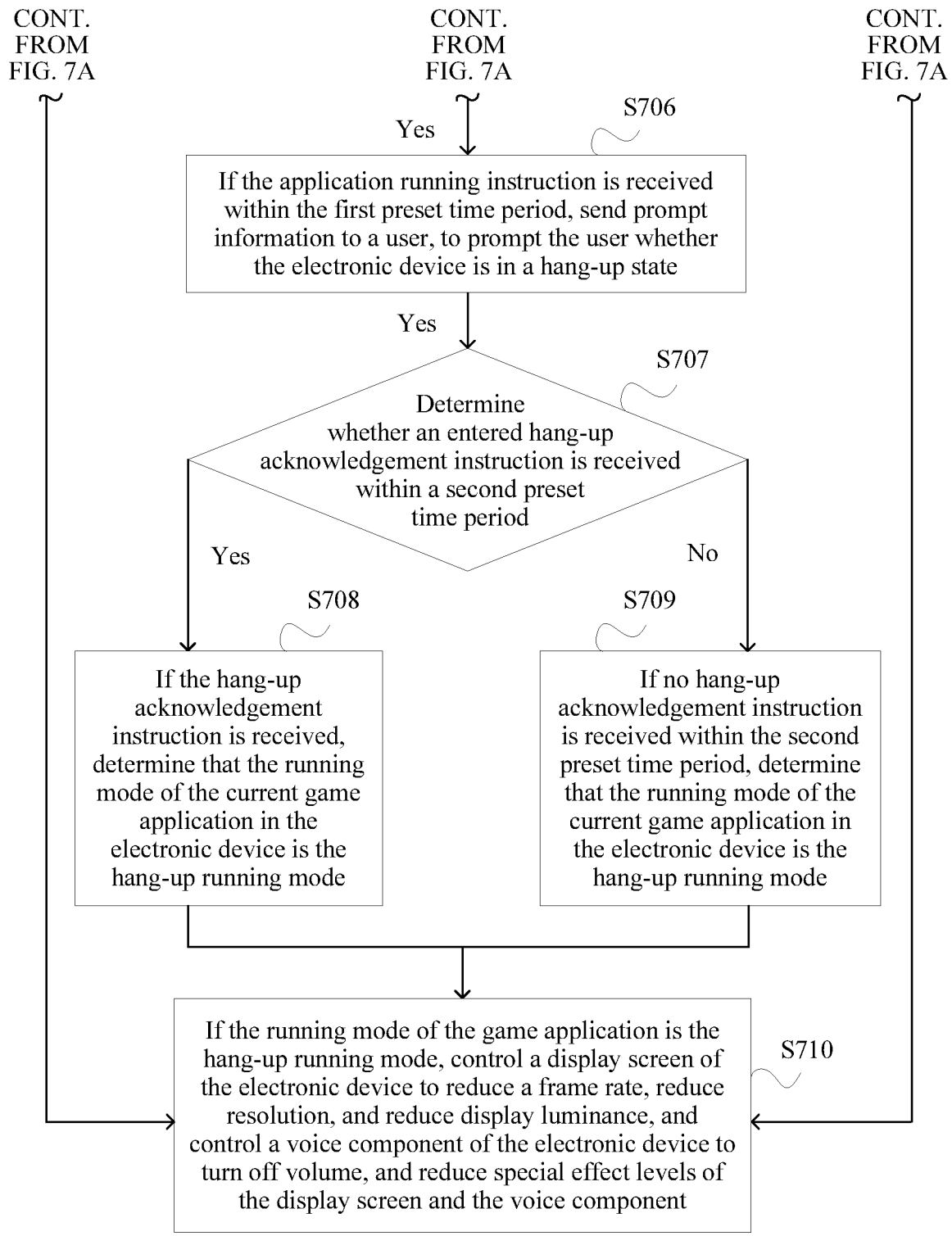

Embodiment 3 of the present invention further provides an electronic device control method. The electronic device control method in Embodiment 3 is specifically described by using an example of a game application. FIG. 7A and FIG. 7B are a flowchart of an electronic device control method according to Embodiment 3 of the present invention. As shown in FIG. 7A and FIG. 7B, the method may include the following steps.

S701. Determine, based on light and data of a gyro sensor, whether a mode of the electronic device is a pocket mode.

S702. If the mode of the electronic device is the pocket mode, determine that a running mode of a current game application in the electronic device is a hang-up running mode.

S703. If the mode of the electronic device is not the pocket mode, determine whether an entered hang-up instruction is received.

S704. If the hang-up instruction is received, determine that the running mode of the current game application in the electronic device is the hang-up running mode, where the hang-up instruction may be an instruction for a preset hang-up button and/or a preset physical button.

S705. If no hang-up instruction is received, determine whether an application running instruction is received within a first preset time period.

S706. If the application running instruction is received within the first preset time period, send prompt information to a user, to prompt the user whether the electronic device is in a hang-up state.

If no application running instruction is received within the first preset time period, go back to S703.

S707. Determine whether an entered hang-up acknowledgement instruction is received within a second preset time period.

S708. If the hang-up acknowledgement instruction is received, determine that the running mode of the current game application in the electronic device is the hang-up running mode.

S709. If no hang-up acknowledgement instruction is received within the second preset time period, determine that the running mode of the current game application in the electronic device is the hang-up running mode.

S710. If the running mode of the game application is the hang-up running mode, control a display screen of the electronic device to reduce a frame rate, reduce resolution, and reduce display luminance, and control a voice component of the electronic device to turn off volume, and reduce special effect levels of the display screen and the voice component.

For example, in S710, the frame rate of the display screen may be reduced to a target frame rate, the resolution may be reduced to target resolution, the display luminance may be adjusted to target luminance, the volume of the voice component may be turned off, and the special effect levels of the display screen and the voice component may be reduced to target special effect levels.

The target frame rate, the target resolution, the target luminance, the turned-off volume, the target special effect level, and the like may be determined based on information that is entered by a user on a configuration interface. The first preset time period and the second preset time period may be determined by the user based on the information entered on the configuration interface.

Figure 8A:
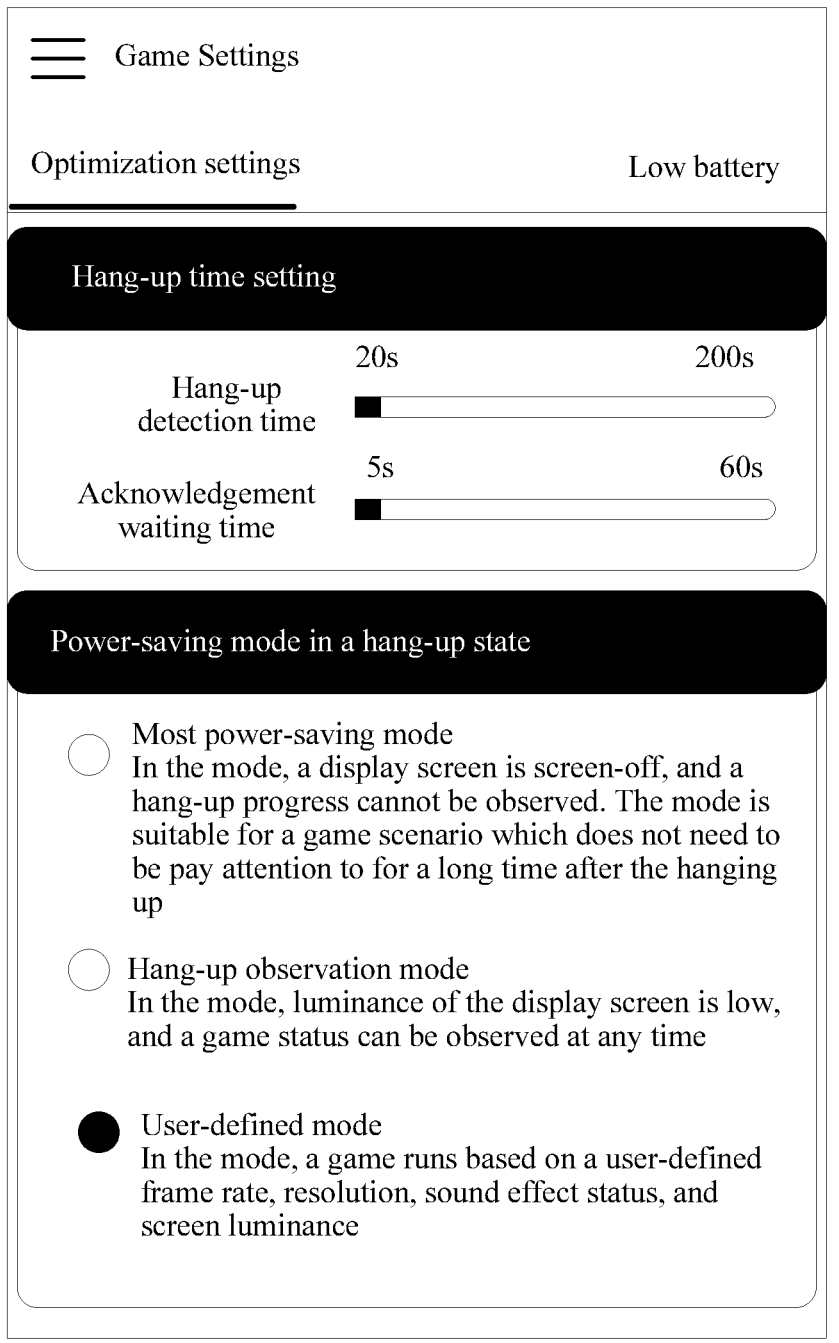
FIG. 8A and FIG. 8B are a schematic diagram of a game settings interface according to Embodiment 3 of the present invention.
Figure 8B:
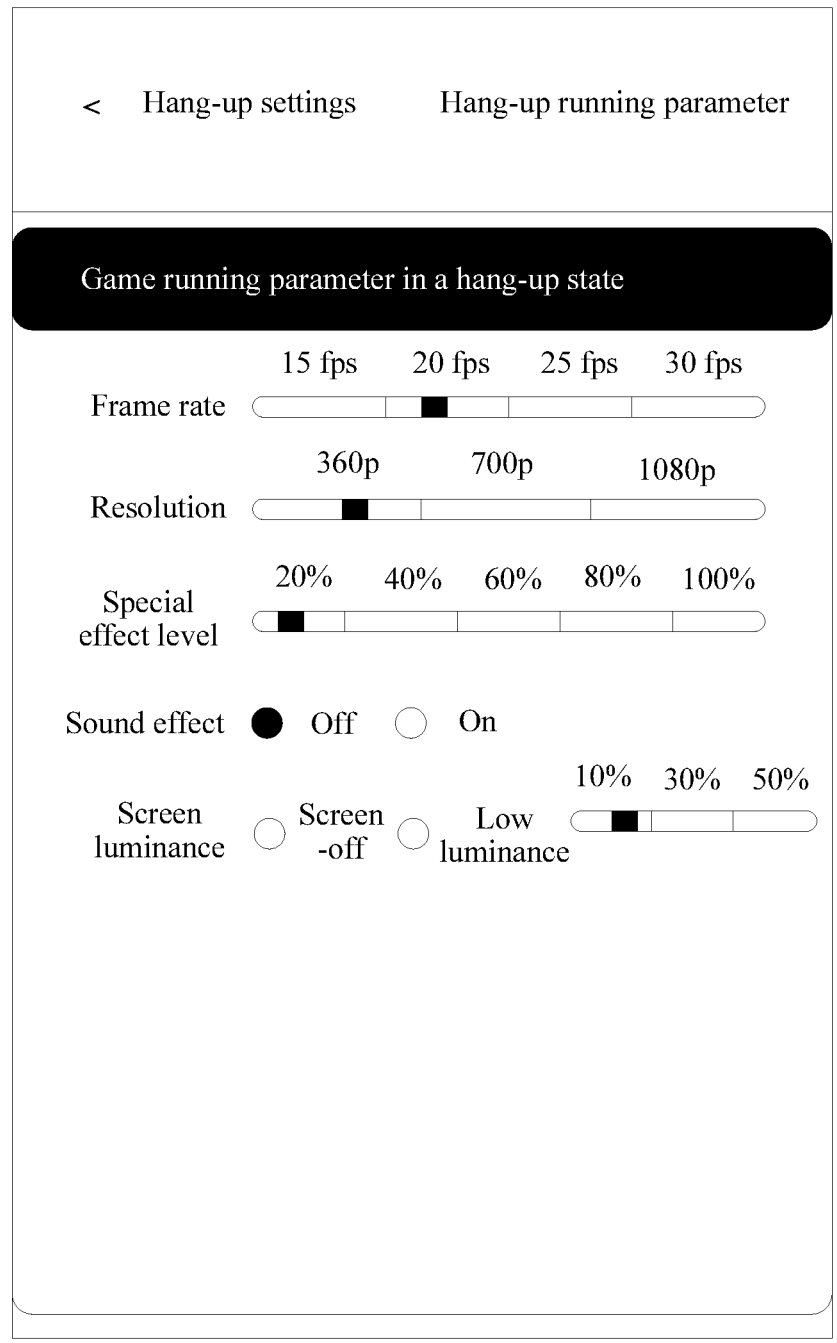

FIG. 8A and FIG. 8B are a schematic diagram of a game settings interface according to Embodiment 3 of the present invention. As shown in FIG. 8A and FIG. 8B, the game settings interface may include a hang-up time setting window, a window of a power saving mode in a hang-up state, and the like. The hang-up time setting window may include a hang-up detection time bar and an acknowledgement waiting time bar. For example, the foregoing first preset time period may be determined based on a time corresponding to the hang-up detection time bar, for example, 20 s. For example, the foregoing second preset time period may be determined based on a time corresponding to the acknowledgement waiting time bar, for example, 5 s.

If a running mode of the game application is a hang-up running mode, in the method, a sub-mode in the hang-up running mode may further need to be determined, and an operation of a component is controlled based on a component target parameter corresponding to the sub-mode.

If the sub-mode in the hang-up running mode is a most power-saving mode shown in FIG. 8A and FIG. 8B, in the method, luminance of a display screen may be further controlled to be a minimum luminance value, namely, screen-off. In the most power-saving mode, a user cannot observe a hang-up progress. The mode is suitable for a game scenario that does not need to be paid attention to for a long time after the hanging up.

If the sub-mode in the hang-up running mode is a hang-up observation mode shown in FIG. 8A and FIG. 8B, in the method, luminance of the display screen may be further controlled to be low, so that a luminance value is less than a preset luminance value but is greater than a minimum luminance value. In the hang-up observation mode, the user can observe a game status at any time.

If the sub-mode in the hang-up running mode is a user-defined mode shown in FIG. 8A and FIG. 8B, in the method, the display screen may be controlled to reduce a frame rate to a user-defined target frame rate, reduce resolution to user-defined target resolution, adjust display luminance to user-defined target luminance, turn off volume of a voice component, and reduce special effect levels of the display screen and the voice component to user-defined target special effect levels.

When the user selects the user-defined mode shown in FIG. 8A and FIG. 8B, the electronic device may further display a hang-up settings interface, and the hang-up settings interface includes a settings bar of a game running parameter in a hang-up state. For example, the target frame rate may be 17 fps shown in FIG. 8A and FIG. 8B, the resolution may be 180 p shown in FIG. 8A and FIG. 8B, the target special effect level may be 10% shown in FIG. 8A and FIG. 8B, and the target luminance may be 5% shown in FIG. 8A and FIG. 8B.

Certainly, an interface layout shown in FIG. 8A and FIG. 8B and parameter configuration on the interface are merely an example description. The present invention is not limited thereto.

According to the electronic device control method provided in Embodiment 3 of the present invention, the method in any one of FIG. 1 to FIG. 6 is described by using a specific instance. For beneficial effects, refer to the foregoing description, and details are not described herein again.

Figure 9:
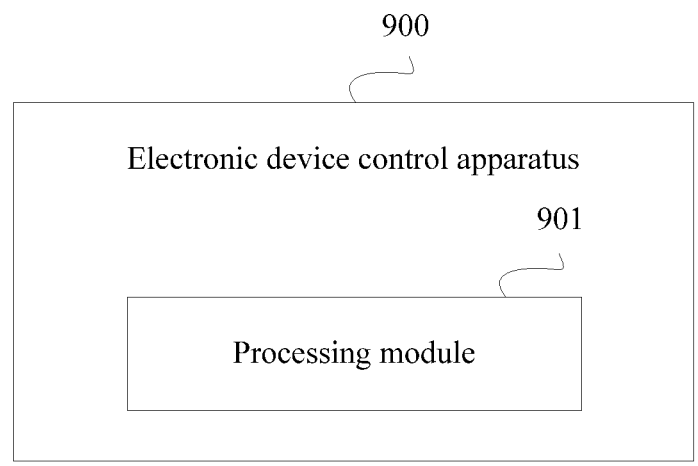
FIG. 9 is a schematic structural diagram of an electronic device control apparatus according to Embodiment 4 of the present invention.

Embodiment 4 of the present invention further provides an electronic device control apparatus, and the electronic device control apparatus may execute the electronic device control method in any one of FIG. 1 to FIG. 8A and FIG. 8B. FIG. 9 is a schematic structural diagram of an electronic device control apparatus according to Embodiment 4 of the present invention. As shown in FIG. 9, the electronic device control apparatus 900 may include:

a processing module 901, configured to: determine a running mode of a current running application in an electronic device; and control, based on the running mode, a component in the electronic device to execute an operation corresponding to the running mode, where the component includes a component required for running the current running application.

Optionally, the processing module 901 is specifically configured to: determine whether the current running application in the electronic device is an application of a preset type; and if the current running application is an application of the preset type, determine the running mode of the current running application in the electronic device.

Optionally, the processing module 901 is specifically configured to: determine, based on an engine identifier of the current running application, whether an engine of the current running application is an engine of the application of the preset type; and if the engine of the current running application is the engine of the application of the preset type, determine that the current running application is the application of the preset type; or if the engine of the current running application is not the engine of the application of the preset type, determine that the current running application is not the application of the preset type.

Optionally, the processing module 901 is specifically configured to: determine, based on a type identifier of the current running application, whether the current running application is the application of the preset type; and if the current running application is the application of the preset type, determine that the current running application is the application of the preset type; or if the current running application is not the application of the preset type, determine that the current running application is not the application of the preset type.

Optionally, the processing module 901 is specifically configured to: determine whether the current running application is an application in a preset application list; and if the current running application is the application in the preset application list, determine that the current running application is the application of the preset type; or if the current running application is not the application in the preset application list, determine that the current running application is not the application of the preset type.

Optionally, the processing module 901 is specifically configured to: determine, based on vendor information of the current running application, whether the current running application is an application of a preset vendor; and if the current running application is the application of the preset vendor, determine that the current running application is the application of the preset type; or if the current running application is not the application of the preset vendor, determine that the current running application is not the application of the preset type.

Optionally, the processing module 901 is specifically configured to execute at least one of the following operations:

controlling a voice device of the electronic device to turn off or turn down volume;
controlling a display screen of the electronic device to reduce resolution;
controlling the display screen to reduce a frame rate;
controlling the display screen to scale down a display window;
controlling the display screen to reduce display luminance;
controlling a processor of the electronic device to reduce image rendering quality;
controlling the processor to reduce a working frequency; and
controlling a random access memory of the electronic device to reduce a working frequency.

Optionally, the processing module 901 is specifically configured to: detect a current device status of the electronic device; and when the detected current component status is greater than or equal to a preset status parameter, control the component in the electronic device to execute the operation corresponding to the running mode.

Optionally, the processing module 901 is specifically configured to execute at least one of the following operations:

controlling a voice device of the electronic device to turn on or turn up volume;
controlling a display screen of the electronic device to increase resolution;
controlling the display screen to increase a frame rate;
controlling the display screen to scale up a display window;
controlling the display screen to increase display luminance;
controlling a processor of the electronic device to improve image rendering quality; and
controlling the processor to increase a working frequency; and
controlling a random access memory of the electronic device to increase a working frequency.

Optionally, the processing module 901 is specifically configured to: detect a current device status of the electronic device; and when the detected current device status is less than a preset status parameter, control the component in the electronic device to execute the operation corresponding to the running mode.

The electronic device control apparatus provided in Embodiment 4 of the present invention may perform the electronic device control method in any one of FIG. 1 to FIG. 8A and FIG. 8B. For a specific implementation process and beneficial effects, refer to the foregoing description, and details are not described herein again.

The following describes an implementation of an electronic device involved in the electronic device control method in any one of FIG. 1 to FIG. 8A and FIG. 8B in the foregoing embodiments of the present invention.

Figure 10:
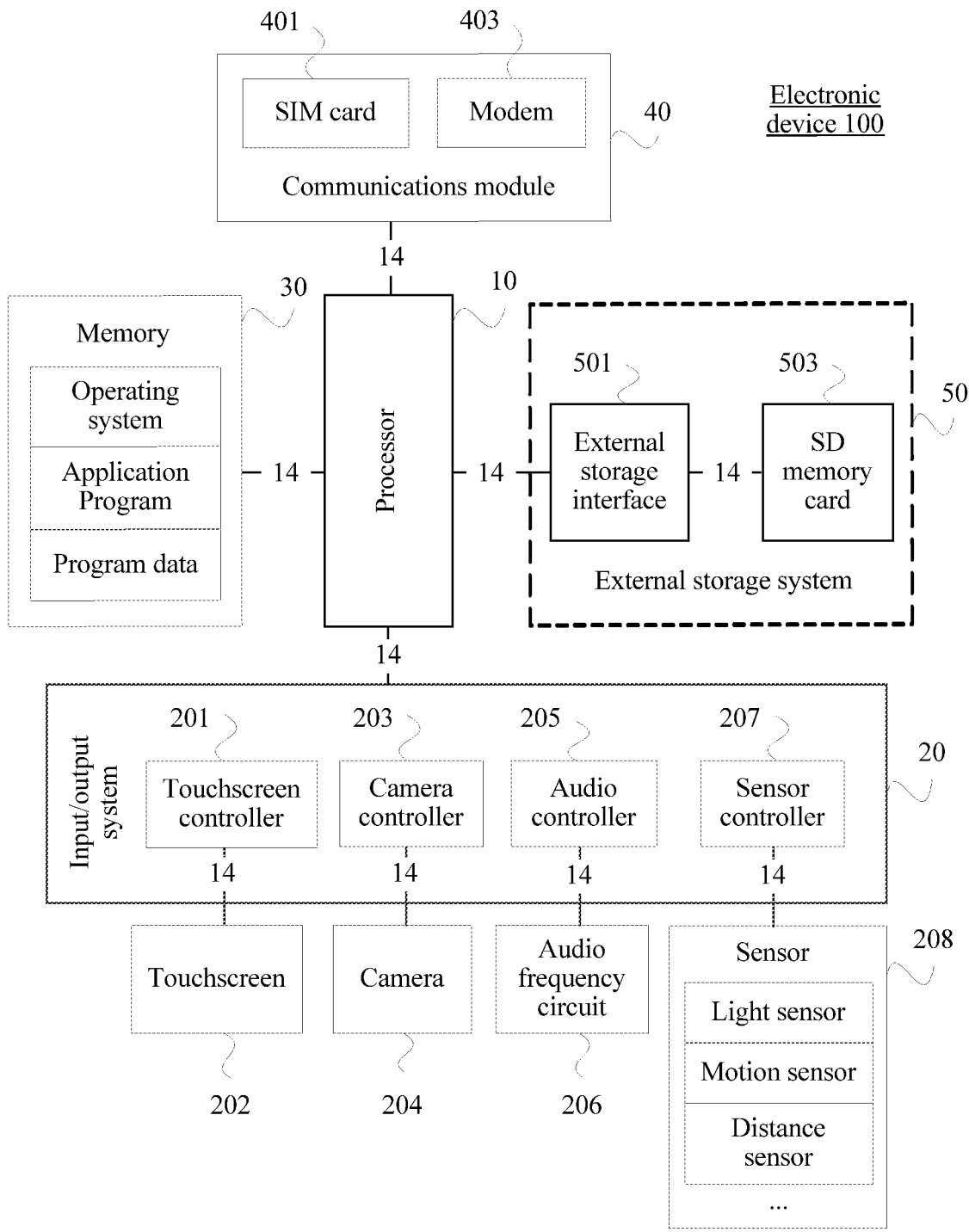
FIG. 10 is a structural block diagram of an electronic device according to Embodiment 5 of the present invention.

FIG. 10 is a structural block diagram of an electronic device according to Embodiment 5 of the present invention. As shown in FIG. 10, the electronic device 100 may include but is not limited to a mobile phone, a tablet computer, a wearable device, a machine-to-machine (Machine to Machine, M2M for short) terminal, or the like. As shown in FIG. 10, the electronic device 100 may include a processor 10, an input/output (Input/Output, I/O for short) system 20, a memory 30, and a communications module 40. The memory 20 may include one or more computer-readable storage media.

The processor 10 may include one or more CPUs, a clock module, and a power management module through integration. The clock module is mainly configured to generate a clock required for data transmission and time sequence control for the processor 10. The power management module is mainly configured to provide a highly precise and stable voltage for the processor 10, the communications module 40, the input/output system 20, and the like.

The input/output system 20 is mainly configured to implement an interaction function between the electronic device 100 and a user/an external environment, and mainly includes an input/output apparatus of the electronic device 100. In a specific implementation, the input/output system 20 may include a touchscreen controller 201, a camera controller 203, an audio controller 205, and a sensor management module 207. The controllers may be respectively coupled to corresponding peripheral devices, such as a touchscreen 202, a camera 204, an audio frequency circuit 206, and a sensor 208. The sensor 208 may include at least one of a light sensor, a motion sensor, a distance sensor, and the like. It should be noted that the input/output system 20 may further include another I/O peripheral.

The memory 30 is coupled to the processor 10 and is configured to store various software programs and/or a plurality of groups of instructions. In a specific implementation, the memory 30 may include a high-speed random access memory, and may also include a nonvolatile memory, such as one or more disk storage devices, a flash memory device, or another nonvolatile solid-state storage device. The memory 30 may store an operating system (system for short), for example, an embedded operating system such as Android, IOS, Windows, or Linux. The memory 30 may further store a network communications program. The network communications program may be used to communicate with one or more auxiliary devices, one or more electronic devices, and one or more network devices. The memory 30 may further store a user interface program. The user interface program may vividly display content of an application program by using a graphical operation interface, and receive, by using an input control such as a menu, a dialog box, or a button, a control operation performed on the application program by the user.

The communications module 40 is configured to receive and send radio frequency signals, and mainly integrates a receiver and a transmitter of the electronic device 100. The communications module 40 communicates with a communications network and another communications device by using the radio frequency signal. In a specific implementation, the communications module 40 may include but is not limited to an antenna system, a radio frequency (Radio Frequency, RF for short) transceiver, one or more amplifiers, tuners, one or more oscillators, a digital signal processor, a coder/decoder (Coder-Decoder, CODEC for short) chip, a subscriber identity module (Subscriber Identity Module, SIM for short) card 401, a modem 403, and the like. In some embodiments, the communications module 40 may be implemented on a separate chip.

In some embodiments, the electronic device 100 may further include an external storage system 50. The processor 10, the input/output system 20, the memory 30, the communications module 40, and the external storage system 50 may communicate with each other on one or more communications buses 14. The external storage system 50 may include an external storage interface 501 and secure digital (Secure Digital, SD for short) memory card 503, and the like.

The memory 30 shown in FIG. 10 may be further configured to store program code.

The processor 10 may invoke the program code in the memory 30, to enable the processor 10 to perform the determining a running mode of a current running application in an electronic device in S101, and perform the controlling, based on the running mode, a component in the electronic device to execute an operation corresponding to the running mode in S102, where the component includes a component required for running the current running application.

Optionally, the processor 10 may invoke the program code in the memory 30, to enable the processor 10 to be specifically configured to: perform the determining whether the current running application in the electronic device is an application of a preset type in S201, and perform the determining the running mode of the current running application in the electronic device if the current running application is an application of the preset type in S202.

Optionally, the processor 10 may invoke the program code in the memory 30, to enable the processor 10 to be specifically configured to: perform the determining whether an engine of the current running application is an engine of the application of the preset type in S301; and if the engine of the current running application is the engine of the application of the preset type, perform the determining that the current running application is the application of the preset type in S302; or if the engine of the current running application is not the engine of the application of the preset type, perform the determining that the current running application is not the application of the preset type in S303.

Optionally, the processor 10 may invoke the program code in the memory 30, to enable the processor 10 to be specifically configured to: perform the determining, based on a type identifier of the current running application, whether the current running application is the application of the preset type in S401; and if the current running application is the application of the preset type, perform the determining that the current running application is the application of the preset type in S402; or if the current running application is not the application of the preset type, perform the determining that the current running application is not the application of the preset type in S403.

Optionally, the processor 10 may invoke the program code in the memory 30, to enable the processor 10 to be specifically configured to: perform the determining whether the current running application is an application in a preset application list in S501; and if the current running application is the application in the preset application list, perform the determining that the current running application is the application of the preset type in S502; or if the current running application is not the application in the preset application list, perform the determining that the current running application is not the application of the preset type in S503.

Optionally, the processor 10 may invoke the program code in the memory 30, to enable the processor 10 to be specifically configured to: perform the determining, based on vendor information of the current running application, whether the current running application is an application of a preset vendor in S601; and if the current running application is the application of the preset vendor, perform the determining that the current running application is the application of the preset type in S602; or if the current running application is not the application of the preset vendor, perform the determining that the current running application is not the application of the preset type in S603.

Optionally, the processor 10 may invoke the program code in the memory 30, to enable the processor 10 to be specifically configured to execute at least one of the following:

controlling a voice device of the electronic device to turn off or turn down volume;
controlling a display screen of the electronic device to reduce resolution;
controlling the display screen to reduce a frame rate;
controlling the display screen to scale down a display window;
controlling the display screen to reduce display luminance;
controlling a processor of the electronic device to reduce image rendering quality;
controlling the processor to reduce a working frequency; and
controlling a random access memory of the electronic device to reduce a working frequency.

Optionally, the processor 10 may invoke the program code in the memory 30, to enable the processor 10 to be specifically configured to: detect a current device status of the electronic device; and when the current component status is greater than or equal to a preset status parameter, control the component in the electronic device to execute the operation corresponding to the running mode.

Optionally, the processor 10 may invoke the program code in the memory 30, to enable the processor 10 to be specifically configured to execute at least one of the following:

controlling a voice device of the electronic device to turn on or turn up volume;
controlling a display screen of the electronic device to increase resolution;
controlling the display screen to increase a frame rate;
controlling the display screen to scale up a display window;
controlling the display screen to increase display luminance;
controlling a processor of the electronic device to improve image rendering quality;
controlling the processor to increase a working frequency; and
controlling a random access memory of the electronic device to increase a working frequency.

Optionally, the processor 10 may invoke the program code in the memory 30, to enable the processor 10 to detect a current device status of the electronic device; and when the current device status is less than a preset status parameter, control the component in the electronic device to execute the operation corresponding to the running mode.

The electronic device provided in Embodiment 5 of the present invention may perform the electronic device control method in any one of FIG. 1 to FIG. 8A and FIG. 8B. For a specific implementation process and beneficial effects, refer to the foregoing description, and details are not described herein again.

Persons of ordinary skill in the art may understand that all or some of the steps of the method embodiments may be implemented by a program instructing relevant hardware. The program may be stored in a computer readable storage medium. When the program is executed, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An electronic device control method, comprising:
    determining that a first application running on an electronic device is in a preset application list, wherein the first application is a game-type application; and
    reducing running resources of the first application by controlling a component of the electronic device to perform a first operation corresponding to a running mode of the first application,
    wherein the running mode comprises a hang-up running mode,
    wherein the component is required for running the first application, and
    wherein the first operation comprises a screen-off operation.

2. The electronic device control method of claim 1, further comprising:
    receiving an input instruction, wherein the input instruction corresponds to a preset on-hook button; and
    controlling, according to the input instruction, the electronic device to change the running mode of the first application to an on-hook running mode.

3. The electronic device control method of claim 1, further comprising:
    receiving an input instruction, wherein the input instruction corresponds to a physical button; and
    controlling, according to the input instruction, the electronic device to change the running mode of the first application to an on-hook running mode.

4. The electronic device control method of claim 1, further comprising:
    receiving an input instruction, wherein the input instruction corresponds to a preset on-hook button and a physical button; and
    controlling, according to the input instruction, the electronic device to change the running mode of the first application to an on-hook running mode.

5. The electronic device control method of claim 1, wherein before reducing the running resources of the first application by controlling the component of the electronic device to perform the first operation corresponding to the running mode of the first application, the electronic device control method further comprises determining that the first application is the game-type application.

6. The electronic device control method of claim 5, further comprising:
    determining, according to an engine identifier of the first application, that an engine of the first application is a game-type application engine; and
    determining that the first application comprises the game-type application when the engine of the first application is the game-type application engine.

7. The electronic device control method of claim 5, further comprising determining, according to a type identifier of the first application, that the first application is the game-type application.

8. The electronic device control method of claim 5, further comprising:
- determining, according to vendor information of the first application, that the first application is associated with a preset vendor; and
- determining that the first application is the game-type application when the first application is associated with the preset vendor.

9. An electronic device, comprising:
- a memory configured to store instructions; and
- a processor coupled to the memory and configured to execute the instructions to cause the electronic device to:
  - determine that a first application running on the electronic device is in a preset application list, wherein the first application comprises a game-type application; and
  - reduce running resources of the first application by controlling a component of the electronic device to perform a first operation corresponding to a running mode of the first application,
  - wherein the running mode comprises a hang-up running mode,
  - wherein the component is required for running the first application, and
  - wherein the first operation comprises a screen-off operation.

10. The electronic device of claim 9, wherein the instructions further cause the electronic device to:
- receive an input instruction, wherein the input instruction corresponds to a preset on-hook button; and
- control, according to the input instruction, the electronic device to change the running mode of the first application to an on-hook running mode.

11. The electronic device of claim 9, wherein the instructions further cause the electronic device to:
- receive an input instruction, wherein the input instruction corresponds to a physical button; and
- control, according to the input instruction, the electronic device to change the running mode of the first application to an on-hook running mode.

12. The electronic device of claim 9, wherein the instructions further cause the electronic device to:
- receive an input instruction, wherein the input instruction corresponds to a preset on-hook button and a physical button; and
- control, according to the input instruction, the electronic device to change the running mode of the first application to an on-hook running mode.

13. The electronic device of claim 9, wherein before the instructions cause the electronic device to reduce the running resources of the first application by controlling the component of the electronic device to perform the first operation corresponding to the running mode of the first application, the instructions further cause the electronic device to determine that the first application is the game-type application.

14. The electronic device of claim 13, wherein the instructions further cause the electronic device to:
- determine, according to an engine identifier of the first application, that an engine of the first application is a game-type application engine; and
- determine that the first application comprises the game-type application when the engine of the first application is the game-type application engine.

15. The electronic device of claim 13, wherein the instructions further cause the electronic device to determine, according to a type identifier of the first application, that the first application comprises the game-type application.

16. The electronic device of claim 13, wherein the instructions further cause the electronic device to:
- determine, according to vendor information of the first application, that the first application is associated with a preset vendor; and
- determine that the first application comprises the game-type application when the first application is associated with the preset vendor.

17. A non-transitory computer-readable medium comprising computer-executable instructions when executed by a processor, cause an electronic device to:
- determine that a first application running on the electronic device is in a preset application list, wherein the first application comprises a game-type application; and
- reduce running resources of the first application by controlling a component of the electronic device to perform a first operation corresponding to a running mode of the first application,
- wherein the running mode comprises a hang-up running mode,
- wherein the component is required for running the first application, and
- wherein the first operation comprises a screen-off operation.

18. The non-transitory computer-readable medium of claim 17, wherein the instructions further cause the electronic device to:
- receive an input instruction, wherein the input instruction corresponds to a preset on-hook button; and
- control, according to the input instruction, the electronic device to change the running mode of the first application to an on-hook running mode.

19. The non-transitory computer-readable medium of claim 17, wherein the instructions further cause the electronic device to:
- receive an input instruction, wherein the input instruction corresponds to a physical button; and
- control, according to the input instruction, the electronic device to change the running mode of the first application to an on-hook running mode.

20. The non-transitory computer-readable medium of claim 17, wherein the instructions further cause the electronic device to:
- receive an input instruction, wherein the input instruction corresponds to a preset on-hook button and a physical button; and
- control, according to the input instruction, the electronic device to change the running mode of the first application to an on-hook running mode.

* * * * *